Aug. 7, 1951  D. ROEDER ET AL  2,563,277
TRACTOR SEAT CONSTRUCTION
Filed Sept. 19, 1947
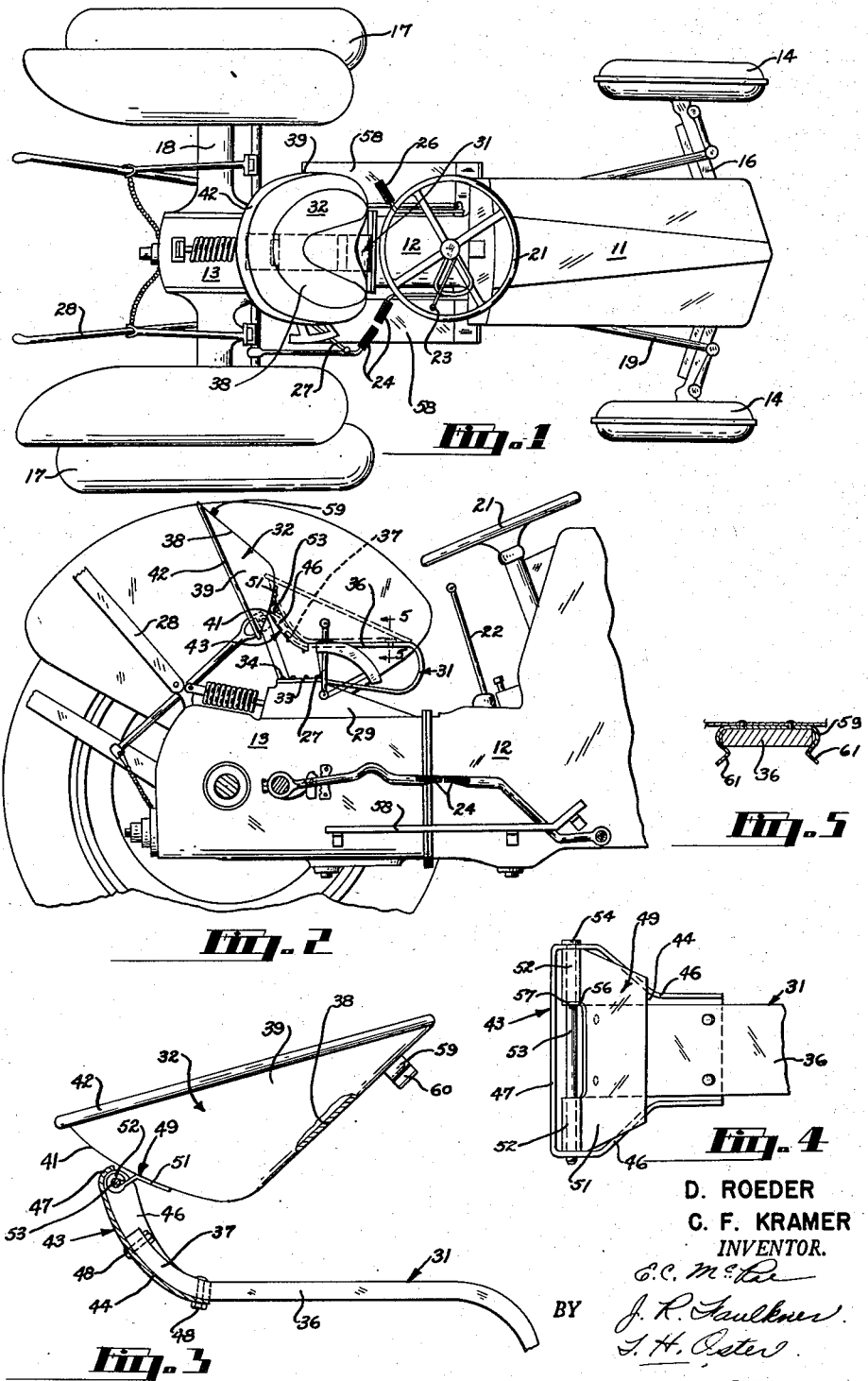
D. ROEDER
C. F. KRAMER
INVENTOR.

Patented Aug. 7, 1951

2,563,277

UNITED STATES PATENT OFFICE 2,563,277

TRACTOR SEAT CONSTRUCTION

Dale Roeder, Detroit, and Clarence F. Kramer, Birmingham, Mich., assignors to Ford Motor Company, Dearborn, Mich., a corporation of Delaware Application September 19, 1947, Serial No. 775,086

3 Claims. (Cl. 155—51)

1

This invention relates generally to tractors, and has particular reference to a seat construction for tractors.

Tractors for general farming purposes are usually provided with a bucket type sheet metal driver's seat supported upon some form of spring structure to provide the necessary resiliency. Aside from this resilient mounting, the seat is generally stationary. During certain operations, however, the stationary seat is a hindrance to the operator. It may, for example, be necessary or convenient for the driver to temporarily assume a standing position while the tractor is in motion. The space available for the driver is generally quite limited, since the steering wheel, engine controls, brake and clutch pedals, gearshift lever, and implement operation controls are usually located immediately adjacent the driver's seat, and it is consequently extremely difficult for the driver to assume a standing position and still be able to properly control the operation of the tractor. With the present construction, however, the driver's seat may be located in a position conveniently adjacent all of the aforementioned controls, yet it may be easily swung to a temporary position out of the driver's way permitting him to assume a standing position upon running boards conveniently provided for that purpose and to continue to operate the necessary controls of the tractor. When it is again desired to assume a seated position, the driver may with a single simple motion return the seat to its normal position.

Although canvas covers are sometimes provided to protect tractor seats when the tractor is left exposed to the weather throughout the night, such covers are inconvenient to use and usually are soon misplaced or abandoned by the farmer. Many tractors are left outdoors over night, resulting in the collection of dew upon the seat, and since tractors are generally used early in the morning before the dew has evaporated, a wet seat must either be tolerated or first wiped dry (with generally nothing available to do this). This rather irksome situation is eliminated by the present construction, in which the tractor seat is pivotally mounted upon its supporting structure in such a manner that it may be readily swung upwardly and rearwardly through an angle of at least 90° to a position such that the seating portion of the seat faces downwardly and is protected from the night dew and also from rain and other weather conditions.

Still another object of the present invention is to provide a seat structure for a tractor in which the seat is pivotally mounted upon a spring bar for swinging movement to an inoperative position, yet in which the structure of the seat, the spring bar and the hinge are such as to provide a rigid support for the seat in its operative position, the seat being maintained in engagement with the spring bar and with the hinge structure to increase its stability. A still further object is to arrange the seat structure in such a manner that the pivot for the seat is located rearwardly of the rear wall of the seat and above the seating portion thereof. This enables the seat to be properly supported upon the spring structure and yet to be readily swung to a position completely out of the way. Another object is to provide simple retaining means for holding the seat in its normal operative position.

The above and other objects and advantages of this invention will be made more apparent as this description proceeds, particularly when considered in connection with the accompanying drawings, in which:

Figure 1 is a plan view of a tractor embodying the present invention.

Figure 2 is a fragmentary side elevational view of the tractor shown in Figure 1 with the right rear wheel removed for clarity, and illustrating the driver's seat in full lines in its raised position, and with its normal operative position being shown in dotted lines.

Figure 3 is an enlarged fragmentary side elevational view, partly in section, of part of the spring bar and the driver's seat with the seat shown partially raised.

Figure 4 is an enlarged fragmentary plan view of the rearward portion of the spring bar and the hinge structure with the seat removed.

Figure 5 is an enlarged transverse cross sectional view taken substantially on the plane indicated by the line 5—5 of Figure 2.

Referring now more particularly to the drawings, there is shown a tractor having a chassis comprising an engine unit 11, a transmission unit 12, and a rear axle unit 13, each comprising castings suitably joined together to form a rigid, frameless chassis for the tractor. Front steerable wheels 14 are conventionally mounted upon a front axle 16, while driven rear wheels 17 are carried by a rear axle 18 extending from the rear axle unit 13. The front wheels 14 are steered by conventional steering linkage 19 connected to the steering wheel 21. Other conventional controls provided adjacent the steering wheel include the transmission gearshift lever 22, engine throttle control 23, brake pedals 24, clutch pedal 26, and the operating lever 27 for the hydraulic lift mechanism (not shown) used to operate linkage 28 to which the desired implements may be attached.

The rear axle unit 13 is provided with a cover 29, in this instance in a form of a casting, which forms a support for a spring bar 31, which in turn supports the driver's seat 32. The spring bar 31 is formed of spring steel and is disposed longitudinally of the tractor, being generally U-shaped in form and opening rearwardly. The lower leg 33 of the spring bar is rigidly mounted at its rearward end to the cover 29 of the rear axle unit by means of studs 34. The upper leg 36 of the spring bar extends generally horizontally when unloaded, and has an upwardly curved portion 37 at its rearward extremity. The spring bar possesses sufficient resiliency to provide a yieldable support for the driver's seat.

The driver's seat 32 is of the bucket type, being formed of sheet metal and having a lower seating portion 38, side walls 39 extending upwardly therefrom and a rear wall 41 extending upwardly from the rearward edge of the seating portion and suitably curved to comfortably accommodate the driver's body. The side walls 39 and the rear wall 41 terminate in a rolled edge 42.

Although other types of hinge structures may be used, the one shown in the drawings is particularly adapted to the present tractor. It comprises a lower hinge section 43 in the form of a sheet metal bracket having a base 44 and side and rear flanges 46 and 47 respectively turned upwardly from the edges of the base. As will be noted particularly from an examination of Figure 3, the base 44 of the lower hinge section is shaped to correspond to the curvature of the curved rearward extremity 37 of the upper leg 36 of the spring bar, and is suitably secured thereto by bolts 48, four bolts being used in the present construction. It will further be noted that the upper edges of the side flanges 46 of the lower hinge section are curved to form a continuation of the upper edge of the top leg 36 of the spring bar and to conform to the curvature of the rear wall 41 of the seat. This arrangement enables the upper leg of the spring bar and the side flanges of the lower hinge section to form a continuous support for the seat in its normal operating position to provide the maximum stability and strength.

Co-operating with the lower hinge section 43 is an upper hinge section 49 in the form of a sheet metal bracket having a base flange 51 riveted or spot-welded to the rear wall 41 of the seat. Bifurcations 52 extend rearwardly from the base flange 51 of the upper hinge section and terminate in rolled portions forming journals for a hinge pin 53. The hinge pin 53 passes through aligned holes formed in the side flanges 46 of the lower hinge section 43, and is retained against transverse movement by means of the head 54 on the pin and a cotter pin 56 passing through the pin and forming a stop for a washer 57 positioned adjacent the inner edge of one of the bifurcations 52. It will thus be seen that the hinge pin 53 forms a pivotal connection between the upper and lower hinge sections 49 and 43 respectively, and makes possible the swinging of the seat 32 from its normal horizontal operative position shown in dotted lines in Figure 2 through an angle of over 90° to the position shown in full lines in Figure 2. Continued rearward swinging movement of the seat is arrested by engagement of the upper hinge section 49 with the upper edge of the rear flange 47 of the lower hinge section. The arrangement is such that the driver's seat in its uppermost position assumes a position such that the seating portion 38 of the seat faces rearwardly and downwardly so as to be protected from the night's dew as well as from rain and other weather conditions. In addition, it will readily be seen that with the seat in its raised position, ample room is provided for the driver to assume a standing position straddling the spring bar 31 and with his feet resting upon running boards 58 mounted upon the tractor chassis on opposite sides thereof immediately below the normal position of the driver's seat.

A general U-shaped retainer 59 is riveted or otherwise suitably secured to the underside of the driver's seat adjacent the forward edge thereof. The retainer is formed of sheet metal and has oppositely disposed V-shaped side flanges 61 adapted to snap over the upper leg 36 of the spring bar to hold the seat in its normal horizontal position, yet which may readily be detached from the spring bar to enable the seat to be swung backwardly.

From the foregoing it will be seen that the present structure achieves the desired object of providing a seat which may be readily moved during operation of the tractor to a position such as to permit the driver to stand upon the running board and operate the controls of the tractor without interference from the seat, and which may also be swung to a position protecting the seating portion of the seat from dew and other weather conditions so as to provide a dry seat for early morning operation, and that these objects have been attained without sacrificing in any way the strength and stability of the seat. A contributing factor to this last-mentioned feature is the arrangement of the spring bar and the lower hinge section in such manner as to provide a continuous rigid support for the base and rear walls respectively of the seat during its normal operative position.

Although we have shown and described certain embodiments of the invention, it will be understood that we do not wish to be limited to the exact construction shown and described, but that various changes and modifications may be made without departing from the spirit and scope of our invention, as defined in the appended claims.

What is claimed is:

1. In a tractor having a chassis supported upon road wheels, a generally U-shaped metal spring bar extending longitudinally of the tractor and opening rearwardly with the lower leg of said bar being mounted upon and secured to said chassis and the upper leg extending generally horizontal in its unloaded position, a bucket type sheet metal driver's seat supported upon the upper side of the upper leg of said spring bar, a hinge structure pivotally connecting said seat to the upper leg of said spring bar, said hinge structure having one hinge section secured to the rearward end of the upper leg of said spring bar and another hinge section secured to the rearward portion of said seat and arranged to permit swinging said seat rearwardly and upwardly through an angle of at least 90°, said bucket seat having a lower seating portion and a rearward wall extending upwardly therefrom, the first-mentioned hinge section comprising a bracket having a base portion secured to the rearward end of said spring bar and curving rearwardly and upwardly adjacent the rearward wall of said seat and side flanges extending upwardly from the lateral edges of said base portion, the upper edges of said side flanges being shaped to correspond to the shape of the rearward wall of said seat to engage and support the latter in the normal operative position of the seat.

2. In a tractor having a chassis supported upon road wheels, a generally U-shaped metal spring bar extending longitudinally of the tractor and opening rearwardly with the lower leg of said bar being mounted upon and secured to said chassis and the upper leg extending generally horizontal in its unloaded position, a bucket type sheet metal driver's seat supported upon the upper side of the upper leg of said spring bar, a hinge structure pivotally connecting said seat to the upper leg of said spring bar, said hinge structure having one hinge section secured to the rearward end of the upper leg of said spring bar and another hinge section secured to the rearward portion of said seat and arranged to permit swinging said seat rearwardly and upwardly through an angle of at least 90°, said bucket seat having a lower seating portion and a rearward wall extending upwardly therefrom, the first-mentioned hinge section comprising a bracket having a base portion secured to the rearward end of said spring bar and curving rearwardly and upwardly adjacent the rearward wall of said seat, and an upper flange extending from the upper edge of said base portion, and said second-mentioned hinge section having an upper rearwardly extending portion arranged to engage the forward edge of the upper flange of said first-mentioned hinge section as a stop arresting further upwardly pivotal movement of said seat after the seat has reached a position such that the seating portion thereof faces rearwardly and downwardly.

3. In a tractor having a chassis supported upon road wheels, a generally U-shaped metal spring bar extending longitudinally of the tractor and opening rearwardly with the lower leg of said bar being mounted upon and secured to said chassis and the upper leg extending generally horizontal in its unloaded position and terminating in an upwardly curved flange at its rearward end, a bucket type sheet metal driver's seat supported upon the upper side of the upper leg of said spring bar, a hinge structure having one hinge section secured to the rearward portion of said seat and a second hinge section having a base portion curved to conform to the curvature of the upwardly curved flange at the rearward end of the upper spring bar leg and continuing upwardly and rearwardly to form an extension thereof, means securing the curved base of the second hinge section to the curved end flange of the upper spring bar leg, and said second hinge section also having side flanges extending upwardly from the lateral edges of its curved base portion, the upper edges of the side flanges being shaped to conform to the rear wall of the seat.

DALE ROEDER.
CLARENCE F. KRAMER.

REFERENCES CITED

The following references are of record in the file of this patent:

UNITED STATES PATENTS

| Number | Name | Date |
|---|---|---|
| 533,300 | Josselyn | Jan. 29, 1895 |
| 2,298,450 | Baker | Oct. 13, 1942 |
| 2,269,968 | Baker | Jan. 13, 1942 |